United States Patent
Liang et al.

(10) Patent No.: US 11,243,694 B2
(45) Date of Patent: Feb. 8, 2022

(54) GROUPING KEY VALUE OBJECT IOS TO IMPROVE IO PERFORMANCE FOR KEY-VALUE STORAGE DEVICES

(71) Applicant: SAMSUNG ELECTRONICS CO., LTD., Suwon-si (KR)

(72) Inventors: Jian Liang, San Jose, CA (US); Ronald Lee, San Jose, CA (US); Benixon Arul Dhas, Gilroy, CA (US); Ramaraj Pandian, Cupertino, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 69 days.

(21) Appl. No.: 16/815,974

(22) Filed: Mar. 11, 2020

(65) Prior Publication Data

US 2021/0232322 A1    Jul. 29, 2021

Related U.S. Application Data

(60) Provisional application No. 62/967,231, filed on Jan. 29, 2020.

(51) Int. Cl.
*G06F 3/06* (2006.01)

(52) U.S. Cl.
CPC .......... *G06F 3/0613* (2013.01); *G06F 3/0659* (2013.01); *G06F 3/0673* (2013.01)

(58) Field of Classification Search
CPC ..... G06F 3/0613; G06F 3/0659; G06F 3/0673
USPC ....................................................... 711/154
See application file for complete search history.

(56) References Cited

U.S. PATENT DOCUMENTS

| | | | |
|---|---|---|---|
| 5,687,396 A * | 11/1997 | Satoh | G06F 3/12 |
| | | | 710/15 |
| 5,963,963 A | 10/1999 | Schmuck et al. | |
| 6,367,002 B1 | 4/2002 | Birkhauser | |
| 6,832,280 B2 | 12/2004 | Malik et al. | |
| 7,831,772 B2 | 11/2010 | Nalawade et al. | |
| 8,612,668 B2 | 12/2013 | Nishimoto et al. | |
| 8,738,841 B2 | 5/2014 | Olbrich et al. | |
| 8,793,531 B2 | 7/2014 | George et al. | |
| 8,825,963 B1 | 9/2014 | Edwards et al. | |
| 9,009,392 B2 | 4/2015 | Jain et al. | |
| 9,075,710 B2 | 7/2015 | Talagala et al. | |
| 9,251,058 B2 * | 2/2016 | Nellans | G06F 3/0679 |
| 9,298,376 B2 | 3/2016 | Colgrove et al. | |

(Continued)

OTHER PUBLICATIONS

K-Fold Cross Validation—Data Driven Investor—Medium, https://medium.com/datadriveninvestor/k-fold-cross-validation-6b8518070833, 8 pages.

(Continued)

*Primary Examiner* — Christopher B Shin
(74) *Attorney, Agent, or Firm* — Lewis Roca Rothgerber Christie LLP

(57) ABSTRACT

Provided is a method of completing object IOs, the method including receiving a first set of object IOs for a target storage device, dispatching the first set of object IOs to a first buffer of a first zone, the first buffer being configured to function as a first log buffer, concatenating the first set of object IOs to form a first object group in the first buffer, logging the first object group to a log device, modifying a function of the first buffer from the first log buffer to a first flush buffer, and transferring the first object group to the target storage device.

17 Claims, 3 Drawing Sheets

(56) References Cited

U.S. PATENT DOCUMENTS

| | | | |
|---|---|---|---|
| 9,760,574 B1* | 9/2017 | Zhai | G06F 3/0659 |
| 9,965,196 B2* | 5/2018 | Singh | G06F 3/064 |
| 10,430,103 B1* | 10/2019 | Jamail | G06F 3/067 |
| 10,769,064 B1* | 9/2020 | Twitto | G06F 12/0246 |
| 2009/0210620 A1 | 8/2009 | Jibbe et al. | |
| 2016/0041918 A1* | 2/2016 | Jeong | G06F 16/1847 |
| | | | 711/103 |
| 2016/0210060 A1 | 7/2016 | Dreyer | |
| 2018/0107601 A1 | 4/2018 | Jin et al. | |
| 2018/0349275 A1 | 12/2018 | Ren et al. | |
| 2018/0357234 A1* | 12/2018 | De | G06F 16/24569 |
| 2019/0244140 A1* | 8/2019 | Lee | G06F 3/0679 |
| 2019/0370088 A1 | 12/2019 | Chen et al. | |

OTHER PUBLICATIONS 11.7 Cross-Validation, STAT 462, Applied Regression Analysis, https://online.stat.psu.edu/stat462/node/200/, 2 pages.
Cross-validation (statistics), Wikipedia, https://en.wikipedia.org/wiki/Cross-validation_(statistics), 13 pages.
Li, Gang et al., "Prediction Accuracy Measures for a Nonlinear Model and for Right-Censored Time-to-Event Data," Nov. 9, 2016, https://arxiv.org/pdf/1611.03063.pdf, 40 pages.
"Tutorial: Understanding Regression Error Metrics in Python", https://www.dataquest.io/blog/understanding-regression-error-metrics/, 7 pages.
Ng, Ritchie, "Evaluating a Linear Regression Model", https://www.ritchieng.com/machine-learning-evaluate-linear-regression-model/, 9 pages.

* cited by examiner

GROUPING KEY VALUE OBJECT IOS TO IMPROVE IO PERFORMANCE FOR KEY-VALUE STORAGE DEVICES

CROSS-REFERENCE TO RELATED APPLICATION(S)

This application claim priority to, and the benefit of, U.S. Provisional Application Ser. No. 62/967,231, filed Jan. 29, 2020, entitled "GROUPING KV OBJECT IOS TO OPTIMIZE IO PERFORMANCE/OBJECT GROUP CLIPPING SCHEMA TO BOOST SMALL K/V OBJECT IO PERFORMANCE," the content of which being incorporated herein in its entirety.

FIELD

One or more aspects of embodiments of the present disclosure relate generally to optimizing input/output ("IO") performance for key-value storage devices.

BACKGROUND

In recent years, key-value solid state drives ("KV-SSDs") have been used in an increasing variety of applications. Enhancing IO performance for KV-SSDs to enhance throughput and to reduce latency may be beneficial.

However, IO performance may be reduced when KV-SSDs encounter a mixture of both large object IOs and small object IOs because KV-SSD processing may address both large object IOs and small object IOs in the same manner.

As a result, KV-SSD processing may favor large object IOs, which results in small object IOs having higher latency. Alternatively, KV-SSD processing may favor small object IOs, which results in large object IOs having lower throughput.

SUMMARY

Aspects of embodiments of the present disclosure are directed toward a system and method that adaptively accommodate both small object IOs and large object IOs to enhance IO performance.

According to one embodiment of the present disclosure, there is provided a method of completing object IOs, the method including receiving a first set of object IOs for a target storage device, dispatching the first set of object IOs to a first buffer of a first zone, the first buffer being configured to function as a first log buffer, concatenating the first set of object IOs to form a first object group in the first buffer, logging the first object group to a log device, modifying a function of the first buffer from the first log buffer to a first flush buffer, and transferring the first object group to the target storage device.

The method may further include receiving a second set of object IOs for the target storage device, dispatching the second set of object IOs to a second buffer of the first zone, the second buffer being configured to function as a second log buffer in response to the first buffer functioning as the first flush buffer, concatenating the second set of object IOs to form a second object group in the second buffer, logging the second object group to the log device, modifying the function of the second buffer from the second log buffer to a second flush buffer, and transferring the second object group to the target storage device.

The method may further include receiving a third set of object IOs for the target storage device, dispatching the third set of object IOs to third buffer of a second zone, the third buffer being configured to function as a third log buffer, concatenating the third set of object IOs to form a third object group in the third buffer, logging the third object group to the log device, modifying the function of the third buffer from the third log buffer to a third flush buffer, and transferring the third object group to the target storage device, wherein the third set of object IOs include high-priority data, and wherein the first set of object IOs or the second set of object IOs include low-priority data.

The method may further include adjusting a timeout window corresponding to a maximum amount of time for storing one of the first set of object IOs in the first log buffer, a maximum number of the first set of object IOs to be held in the first log buffer, or a threshold size of the first object group, wherein the first object group is logged to the log device based on the timeout window, the maximum number of object IOs to be held in first the log buffer, or the threshold size of the first object group.

The adjusting the timeout window, the maximum number of the first set of object IOs, or the threshold size may be performed according to a feedback algorithm.

The method may further include processing data stored in the first buffer using a field-programmable gate array.

The method may further include receiving large object IOs, separating the large object IOs from the first set of object IOs, and passing the large object IOs directly to the target storage device.

The transferring the first object group to the target storage device may include searching a linked list including dirty object IOs linked together, and transferring the dirty object IOs to the target storage device, the dirty object IOs being of the first object group.

According to another embodiment of the present disclosure, there is provided a non-transitory computer readable medium implemented on a system for completing object IOs, the non-transitory computer readable medium having computer code that, when executed on a processor, implements a method of completing object IOs, the method including receiving a first set of object IOs for a target storage device, dispatching the first set of object IOs to a first buffer of a first zone, the first buffer being configured to function as a first log buffer, concatenating the first set of object IOs to form a first object group in the first buffer, logging the first object group to a log device, modifying a function of the first buffer from the first log buffer to a first flush buffer, and transferring the first object group to the target storage device.

The computer code, when executed by the processor, may further implement the method of completing object IOs by receiving a second set of object IOs for the target storage device, dispatching the second set of object IOs to a second buffer of the first zone, the second buffer being configured to function as a second log buffer when the first buffer functions as the first flush buffer, concatenating the second set of object IOs to form a second object group in the second buffer, logging the second object group to the log device, modifying the function of the second buffer from the second log buffer to a second flush buffer, and transferring the second object group to the target storage device.

The computer code, when executed by the processor, may further implement the method of completing IOs by receiving a third set of object IOs for the target storage device, dispatching the third set of object IOs to third buffer of a second zone, the third buffer being configured to function as a third log buffer, concatenating the third set of object IOs to form a third object group in the third buffer, logging the third object group to the log device, and modifying the function of the third buffer from the third log buffer to a third flush buffer, and transferring the third object group to the target storage device, wherein the third set of object IOs include high-priority data, and wherein the first set of object IOs or the second set of object IOs include low-priority data.

The computer code, when executed by the processor, may further implement the method of completing IOs by adjusting a timeout window corresponding to a maximum amount of time for storing one of the first set of object IOs in the first log buffer, a maximum number of the first set of object IOs to be held in the first log buffer, or a threshold size of the first object group, wherein the first object group is logged to the log device based on the timeout window, the maximum number of object IOs to be held in first the log buffer, or the threshold size of the first object group.

The adjusting the timeout window, the maximum number of the first set of object IOs, or the threshold size may be performed according to a feedback algorithm.

The computer code, when executed by the processor, may further implement the method of completing IOs by processing data stored in the first buffer using a field-programmable gate array.

The computer code, when executed by the processor, may further implement the method of completing IOs by receiving large object IOs, separating the large object IOs from the first set of object IOs, and passing the large object IOs directly to the target storage device.

The transferring the first object group to the target storage device may include searching a linked list including dirty object IOs linked together, and transferring the dirty object IOs to the target storage device, the dirty object IOs being of the first object group.

According to yet another embodiment of the present disclosure, there is provided a system for completing object IOs, the system including a log device, a target storage device, and a memory cache, wherein the system is configured to receive a first set of object IOs for a the target storage device, dispatch the first set of object IOs to a first buffer of a first zone, the first buffer being configured to function as a first log buffer, concatenate the first set of object IOs to form a first object group in the first buffer, log the first object group to the log device, modify a function of the first buffer from the first log buffer to a first flush buffer, and transfer the first object group to the target storage device.

The system may be further configured to receive a second set of object IOs for the target storage device, dispatch the second set of object IOs to a second buffer of the first zone, the second buffer being configured to function as a second log buffer in response to the first buffer functioning as the first flush buffer, concatenate the second set of object IOs to form a second object group in the second buffer, log the second object group to the log device, modify the function of the second buffer from the second log buffer to a second flush buffer, and flush the second object group to the target storage device.

The system may be further configured to receive a third set of object IOs for the target storage device, dispatch the third set of object IOs to third buffer of a second zone, the third buffer being configured to function as a third log buffer, concatenate the third set of object IOs to form a third object group in the third buffer, log the third object group to the log device, modify the function of the third buffer from the third log buffer to a third flush buffer, and transfer the third object group to the target storage device, wherein the third set of object IOs include high-priority data, and wherein the first set of object IOs or the second set of object IOs include low-priority data.

The system may be further configured to adjust a timeout window corresponding to a maximum amount of time for storing one of the first set of object IOs in the first log buffer, a maximum number of the first set of object IOs to be held in the first log buffer, or a threshold size of the first object group, wherein the first object group is logged to the log device based on the timeout window, the maximum number of object IOs to be held in first the log buffer, or the threshold size of the first object group.

Accordingly, the system of embodiments of the present disclosure are able to improve IO performance by adaptively accommodating both small object IOs and large object IOs to thereby increase throughput of object IOs while decreasing average latency of small object IOs.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
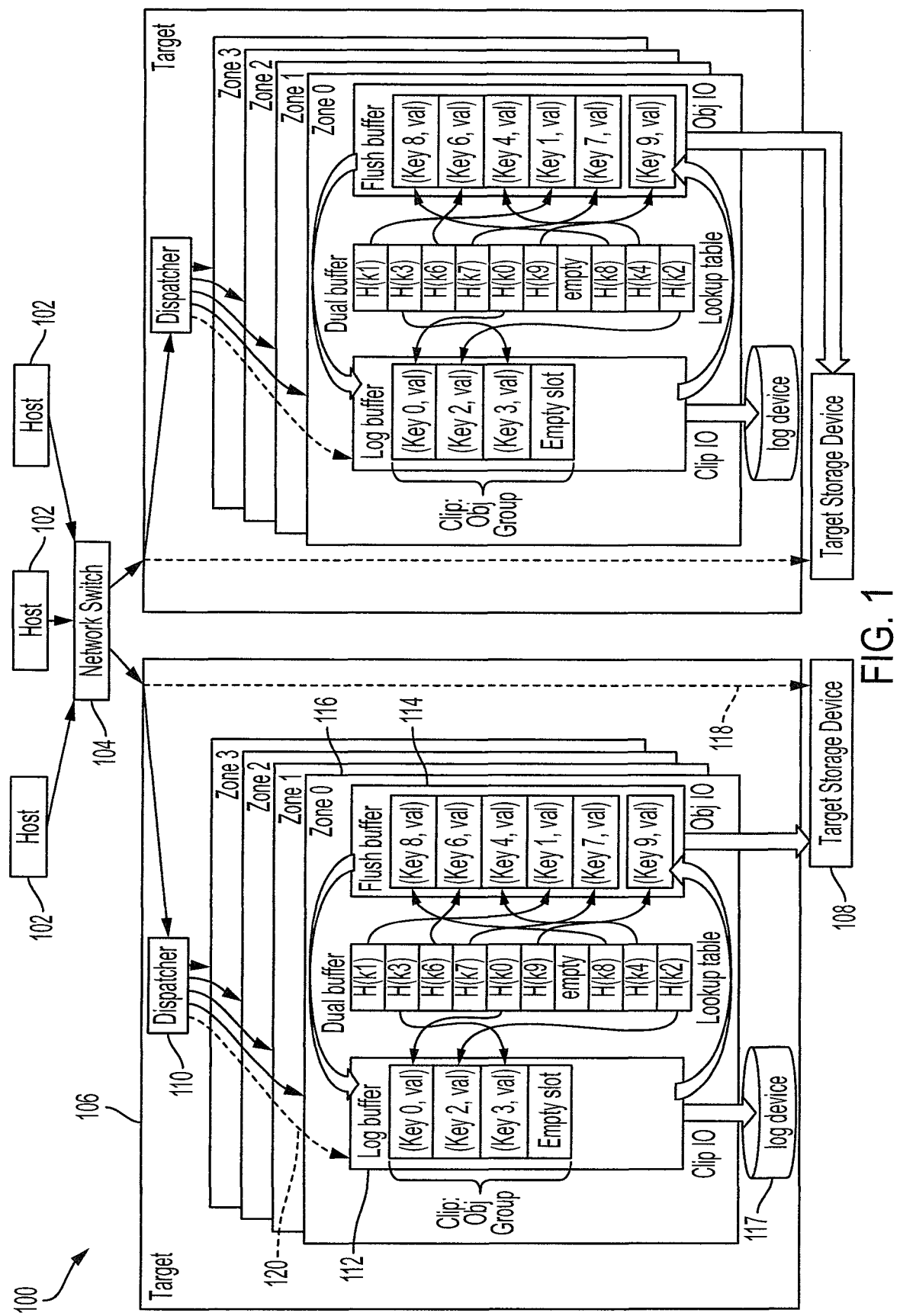
FIG. 1 is a block diagram depicting a network for improving IO performance according to one or more embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system).

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

As used herein, the terms "first buffer", "second buffer", "third buffer", etc., are used to describe a buffer range that may serve a particular function (e.g., log buffer function or flush buffer function), and may change or be modified depending on certain conditions described in more detail below. Therefore, in one or more embodiments, the terms "first buffer", "second buffer", "third buffer", etc., may refer to different portions of a single buffer, while in one or more other embodiments, the terms "first buffer", "second buffer", "third buffer", etc., may refer to more than one buffer.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a block diagram depicting a network according to one or more embodiments of the present disclosure.

Referring to FIG. 1, a network 100 according to one or more embodiments of the present disclosure follows a NVMeoF (Non-Volatile Memory Express over Fabrics) architecture. In one or more embodiments, the network 100 includes a host 102, a network switch 104 (e.g., a NVMeoF switch), a target 106 (e.g., a NVMe target), and a target storage device 108 (e.g., NVMe-based Key-Value SSD or KV-SSD).

With reference to FIG. 1, one or more hosts 102 may generate one or more IO requests according to data processing applications or software. The IO requests may include IO operations such as "put", "get", "delete", etc., for object-based storage (e.g., for key-value storage). The IO requests may include different IO sizes (e.g., small object IOs and/or large object IOs). The one or more hosts 102 may forward or transmit one or more IO requests to the network switch 104, such as a multi-port network bridge that connects devices together on a computer network. The network switch 104 may use hardware addresses to process and forward data. Therefore, the network switch 104 may transmit the one or more IO requests to a suitable target 106 from among one or more targets.

A target 106 from among the one or more targets 106 may include a dispatcher 110, memory cache (e.g., a dynamic random access memory (DRAM) cache), and a log device 117 (e.g., a low latency log device). The dispatcher 110 may be a KV IO dispatcher for receiving and dispatching one or more IOs from the network switch 104 to portions of the memory cache. The memory cache may include one or more zones 116, which may be formed by partitions in the memory cache, for receiving and handling small object IOs from the dispatcher 110.

The zone(s) 116 may include a log buffer 112 that receives the one or more small object IOs dispatched from the dispatcher 110. For example, at least two zones may each include a log buffer that receives one or more respective small object IOs dispatched from the dispatcher 110. The dispatcher 110 may dispatch one or more IOs (referred to as sets) to corresponding log buffers in multiple zones.

The log buffer 112 may log or store object IOs received from the dispatcher 110 in the log device 117. As an example, the log device 117 may be a non-volatile dual in-line memory module (NVDIMM) or a low latency SSD for crash recovery purposes.

The log device 117 may maintain a log in persistent memory that can be checked after a system crash to determine whether respective IOs are completed. If one or more IOs are not completed, the system can determine what additional steps, if any, may be suitable to complete any uncompleted IOs based on the log. The log device 117 may suitably use less storage capacity than a target storage device 108 (e.g., to save on cost).

The zone 116 may include a flush buffer 114 that flushes (e.g., writes or transfers the content of the flush buffer to a destination such as a target storage device) object IOs to the target storage device 108 (e.g., to a KV-SSD) to complete an IO. Other embodiments of the target storage device 108 may include any hardware and/or software system capable of storing objects.

Depending on the size of the object IOs received from the network switch 104, the target 106 may determine a path for the object IO. For example, the target 106 may include a first path (e.g., a normal path) 118 through which one or more large object IOs received by the target 106 may pass directly to the target storage device 108 without being received by the log buffer 112, such that the object IOs may be stored in the log device 117. Large object IOs may be object IOs that are at or above a threshold size, wherein the threshold size may be adjustable in one or more embodiments.

The target 106 may also include a second path (e.g., a grouping path) 120 through which one or more small object IOs are received by the dispatcher 110. The small object IOs may be object IOs below the threshold size. On the second path 120, the dispatcher 110 may dispatch or transmit the one or more small object IOs to a corresponding zone 116 (e.g., to the log buffer 112 of the zone 116). The one or more small object IOs on the second path 120 may be concatenated in the log buffer 112 to form an object group 216, or clip, according to a grouping schema according to one or more embodiments of the present disclosure.

Accordingly, as described above, object IOs may be screened or separated by an adjustable size threshold, and large object IOs may follow a first path 118 while small object IOs follow a second path 120 according to the disclosed grouping schema.

Although the target 106 is described herein as corresponding to the path(s) for the object IO(s), other suitable modules or devices may be used to determine the path(s) for the object IO(s) based on size in one or more other embodiments. Further, large object IOs might not be screened or separated, and may be dispatched to a zone for any suitable purpose. For example, instead of bypassing a log-flush buffer cycle, to be described below, a large object IO on the first path 118 may be dispatched directly to a flush buffer to be flushed directly to the target storage device 108. In this case, another system that serves the same function as the log buffer 112 may be used to recover data during a system crash, for example, a distributed system with a redundant copy.

Although the target storage device 108 is depicted in FIG. 1 as separate from the target 106, the classification of the target storage device 108 is not limited thereto, and the target storage device 108 could be considered part of the target 106 in other embodiments. Further, while three hosts 102, two targets 106, and two target storage devices 108 are illustrated in FIG. 1, any suitable number of hosts, targets, and target storage devices may be used with suitable modifications to the inputs and outputs of one or more hosts 102, target 106, and target storage device 108. Accordingly, the network switch 104 may transmit IO requests to multiple targets 106 associated with one or more target storage devices 108. As a result, the NVMeoF architecture may connect multiple KV-SSDs (e.g., thousands or more KV-SSDs housed in dedicated storage-only servers) to hosts.

Figure 2:
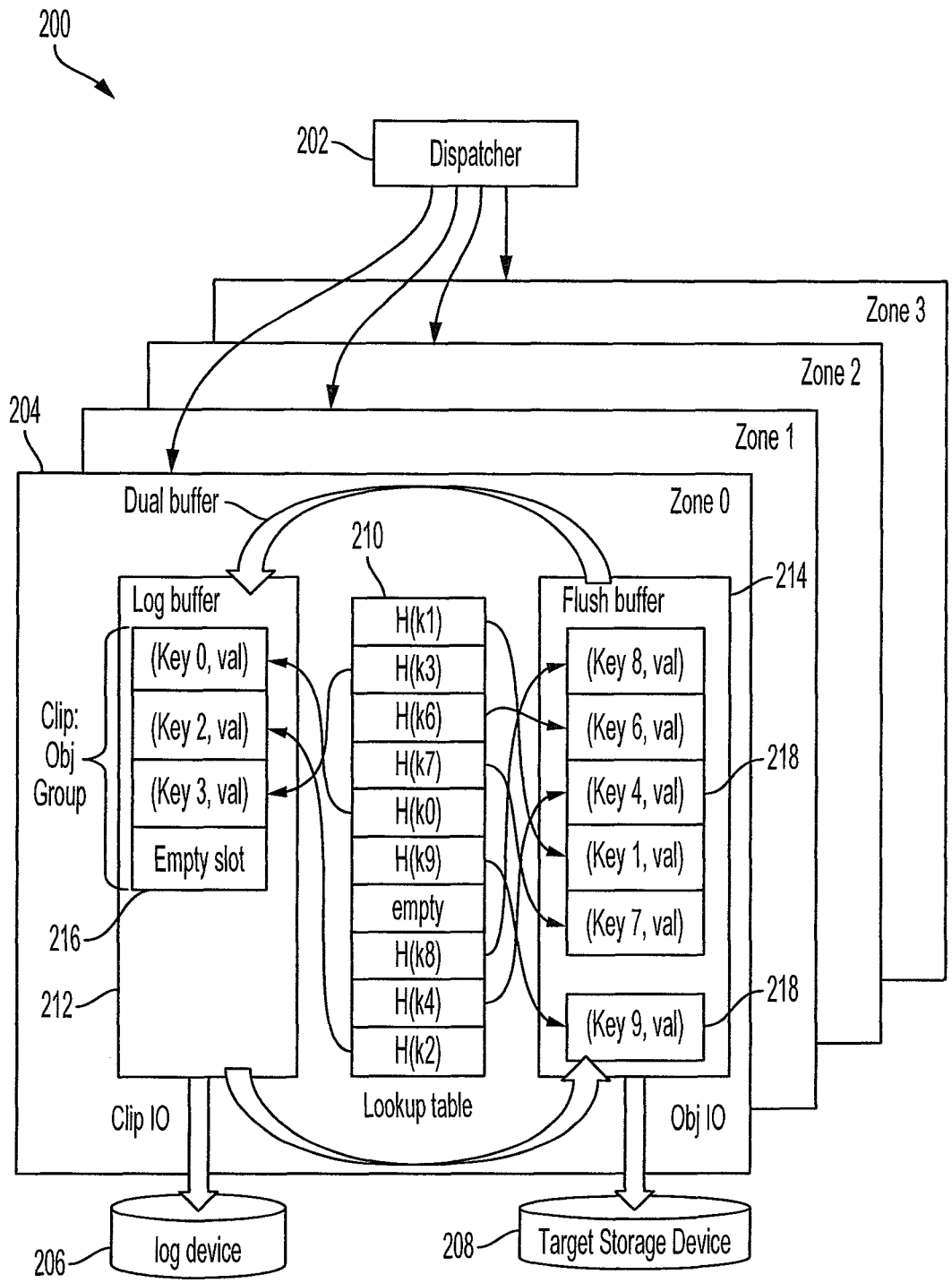
FIG. 2 is a block diagram depicting a grouping schema according to one or more embodiments of the present disclosure.

FIG. 2 is a block diagram depicting a grouping schema according to one or more embodiments of the present disclosure.

Referring to FIG. 2, the grouping schema 200 includes a dispatcher 202 (e.g., a KV IO Dispatcher), one or more zones 204, a log device 206, and a target storage device (e.g., persistent storage device such as KV-SSD) 208.

The target (e.g., the target 106 of FIG. 1) may include a hash table 210 for lookup in each zone, and a linked list of dirty object IOs (e.g., object IOs that are not yet completed). The dispatcher 202 may determine which zone from among one or more zones 204 to send a key value of a small object IO based on a hash key, which may be determined from the hash table 210 included in each of one or more zones 204.

The target may include a linked list that maintains the order of the dirty object IOs (e.g., a linked list that orders the object IOs sequentially on a first-come first-serve basis). The linked list may be used by the memory cache to identify the dirty object IOs in the memory cache. In one or more embodiments, the linked list may be saved in the memory cache. Therefore, the linked list of the dirty object IOs may be used to link the dirty object IOs together to efficiently flush the dirty object IOs by identifying the dirty object IOs, as opposed to searching the entire hash table 210. Identifying the dirty object IOs may be achieved by scanning from the top of the linked list to the tail of the linked list. Accordingly, an efficient way of determining which buckets of the hash table 210 have dirty object IOs may avoid unnecessarily searching the hash table 210 for the dirty object IOs to be flushed.

The use of multiple zones 204 enables the designation of different zones for different respective purposes. For example, zones 204 may be designated for different types of data having different throughput and latency requirements. The dispatcher 202 may determine the respective zones 204 for receiving the dispatched IOs based on a priority associated with the IOs. For example, high-priority data may be sent to a first zone for high-priority data, while low-priority data may be sent to a second zone for low-priority data. The first zone and the second zone may have different threshold parameters, traffic, and/or data-processing characteristics to accommodate high-priority data and low-priority data respectively. Accordingly, IO performance may be optimized or improved as data having higher priority may be distinguished from data having lower priority such that the different data may be sent to a respective suitable zone by the dispatcher 202.

The use of multiple zones 204 enables a lockless IO process by zoning objects in non-sharing threads. In other words, zones 204 may be dedicated such that, for example, requests for a same object are mapped to the same corresponding zone 204. As an example, a zone 204 may be designated to use one type of command (e.g., a "read" command) that allows the zone 204 to keep handling requests and completions. Accordingly, the lock-less implementation may avoid a "read" or "write" command of the same object occurring at the same time or in the same occurrence.

In one or more embodiments, if the object IO is of sufficiently high priority (e.g., a "highest" priority), then, regardless of the size of the object IO, the object IO may follow the first path (e.g. the first path 118 of FIG. 1), and may skip the log-flush buffer cycle to pass directly to the target storage device 208. By skipping the log-flush buffer cycle, the object IO goes through the normal IO path (e.g., the first path 118 of FIG. 1) without being saved in the log device 206, and without passing through a log buffer 212. Therefore, latency for the individual high-priority object IO is reduced. Accordingly, the system and method of the present disclosure may be configured to screen or separate object IOs to place the object IOs in different respective zones 204, and/or through different respective paths, based on priority.

The zones 204 for receiving key values from the dispatcher 202 may be customized. As an example, one or more zones 204 may be designated for deduplication, compression, and/or the like before the IO is completed (e.g., before data is flushed to the target storage device 208).

In one or more embodiments, the designation of a zone 204 for deduplication, compression, and/or the like may be accomplished using NVME name spaces or a prefix of a key to identify a service or application. However, embodiments of the present disclosure are not limited hereto, and other suitable methods of designating a zone 204 for a particular type of data processing may be used in accordance with the present disclosure. Further, and as an example, further data processing, such as deduplication, compression, and/or the like, may be performed by a field-programmable gate array (FPGA). However, any suitable device may be used for processing data in a zone 204, and any further suitable form of data processing may be performed in accordance with the present disclosure.

According to one or more embodiments, each of the one or more zones may include a memory cache including one or more buffers. For example, a zone 204 may include a first buffer (e.g. a log buffer) 212 and a second buffer (e.g. a flush buffer) 214. It should be noted, however, that the first buffer 212 and the second buffer 214 may freely change functions (e.g., from a log buffer to a flush buffer and/or from a flush buffer to a log buffer), and the functions may be set according to a software module running on top of the target storage device 208.

The log buffer (e.g., the first buffer 212 illustrated in FIG. 2) may accept incoming small object IO requests as part of the second path (e.g. the second path 120 of FIG. 1). The log buffer may prepare the small object IOs by grouping the received small object IOs together. In other words, the first buffer 212 may concatenate each small object IO with one or more other small object IOs to form an object group, or clip, 216.

The log buffer may continue to receive small object IOs until a condition or trigger is reached (e.g., until an object group size surpasses a threshold or maximum size, until a maximum number of small object IOs have been formed into an object group 216, and/or until a timeout window has lapsed, wherein the threshold, maximum number, and/or timeout window are adjustable in one or more embodiments). The timeout window refers to a time period during which small object IOs is received by, or within, the log buffer. For example, the time period may be set according to latency and throughput suitability of the small object IOs according to an object group 216 and/or zone 204.

For example, the time period of the timeout window may be adjusted based on at least the priority of object IOs in the object group 216 (e.g., based on the number of object IOs and/or the time elapsed since a high-priority object IO is received), and/or may be adjusted based on a zone-related condition (e.g., based on a designation as a high-priority zone or as a low-priority zone).

The end of the receiving period for the log buffer may depend on a single condition. However, in one or more embodiments, the end of the receiving period may depend on more than one condition. For example, the end of the receiving period may depend on any set condition or trigger that is satisfied first, or may depend on a combination such as, for example, a weighted combination of the object group size, a number of small object IOs in the group, priority, and/or elapsed time. However, it should be note that the above is provided as a non-limiting example.

In one or more embodiments, adaptive adjustments to target conditions, log buffer conditions, and/or flush buffer conditions may be performed according to an adaptive feedback algorithm. As an example, the adaptive feedback algorithm is based on the output performance of the IOs using, for example, an initial buffer size, object IO threshold size, number of objects per object group, and/or timeout window. Based on the performance of these initial parameters, the adaptive feedback algorithm may adjust the buffer size, object IO threshold size, number of objects per object group, and/or timeout window. For example, the adaptive feedback algorithm may monitor output performance as the size and frequency of inbound IOs changes (e.g., as an inbound IO pattern changes), and may determine that the buffer size may be suitably increased, or that the timeout window may be suitably decreased, because the log buffer reaches full capacity before the timeout window is reached.

Alternatively, the adaptive feedback algorithm may determine that the buffer size may be suitably decreased, or that the timeout window may be suitably increased, because the timeout window is reached too frequently. Determination of whether to adjust the timeout window, the buffer size, and/or the number of objects in the log buffer may be based on which parameter improves the number of object IOs completed per second (IOPS). Accordingly, the adaptive feedback algorithm may intuitively set up the object IO threshold size, buffer size, object IO threshold size, number of objects per object group, and/or timeout window.

Although the term "object group" is used throughout the specification, if only a single small object IO is received, and no other small object IOs are received by the log buffer within the receiving period, then concatenation might not occur, and the object group 216 may include only the single small object IO.

Accordingly, an object group, or clip, 216 comprising one or more small object IOs is formed in the log buffer 212. The concatenated object group 216 may be treated as a single large object IO (due to concatenation) for the purpose of writing small object IOs to a storage device, such as the log device 206, and to the target storage device 208, such as the KV-SSD. In this manner, average latency and throughput for small object IOs may be enhanced because the small object IOs are treated as a single large object IO.

In one or more embodiments, the log buffer persists, or logs, the object group 216 to the log device 206, which may be a device having persistent memory, for crash recovery purposes. For example, if a system crash occurs before the object IOs are completed (e.g., before the object IOs are flushed to the target storage device 208), the logged data may be used to help recover the object IOs that were previously in the log buffer. Therefore, the system may determine whether the logged IOs are completed, and may also determine what steps, if any, would suitably complete the logged IOs.

In one or more embodiments, the log buffer may be configured to change roles to function as the flush buffer after logging the small object IOs to the log device 206. For example, the flush buffer (e.g., the second buffer 214 illustrated in FIG. 2) may have stored therein an object group, or clip, 218 comprising small object IOs. The flush buffer may include multiple object groups 218 should multiple log buffers change roles to function as flush buffers (e.g., thereby forming a single flush buffer that is greater size).

Upon reaching a certain condition, such as a threshold flush buffer size and/or a threshold idle period (e.g., based on an elapsed time of object IOs being present in the flush buffer), the flush buffer may flush the contents of the flush buffer (e.g., may flush the object group 218) to the target storage device 208. Then, the contents of the flush buffer may be marked for deletion to purge the contents of the flush buffer to thereby free up space in the memory cache when the flush buffer is emptied and the object IOs are completed.

After the flush buffer is emptied, the flush buffer may be available to change roles to function as a log buffer, thereby fulfilling a single log-flush cycle. In one or more embodiments, the first buffer 212 and the second buffer 214 may repeat multiple log-flush cycles concurrently (e.g., substantially simultaneously). Also, the threshold flush buffer size and/or threshold idle period may be adjustable (e.g., by an algorithm, application programing interface, configuration file, or any other suitable method).

Accordingly, the first buffer 212 and the second buffer 214 may have opposing roles in terms of functionality within the disclosed systems. For example, the first buffer 212 may function as a log buffer, while the second buffer 214 may function as a flush buffer. As described above, when the first buffer 212 changes roles to function as a flush buffer, the second buffer 214 changes roles to function as a log buffer. In other words, IOs may be dispatched from the dispatcher 202 to the second buffer 214 that functions as a log buffer (e.g., that concatenates incoming IOs to form a second object group 216, and that logs the contents thereof, such as the second object group 216, to the log device 206), while the first buffer 212 functions as a flush buffer (e.g., while the first buffer 212 flushes a first object group 218 to a KV-SSD 208). Subsequently, the first buffer 212 may return to functioning as a log buffer while the second buffer 214 returns to functioning as a flush buffer. Accordingly, IO throughput and low IO latency may be maintained because there is an active log buffer and active flush buffer for concurrently processing data.

In one or more embodiments, a size of the log buffer and/or the flush buffer may be dynamically altered to accommodate adjustments from an adaptive feedback algorithm. For example, the dispatcher 202 may determine that a suitably sized log buffer is suitable for accommodating an object IO to be dispatched based on the size thereof and based on previous IOs dispatched to the log buffer. Therefore, the size of the log buffer may be adjusted to be able to receive additional object IOs. Further, the dispatcher 202 may dispatch object IOs to corresponding zone 204 based on available space or memory of the log buffer in that zone 204.

Figure 3:
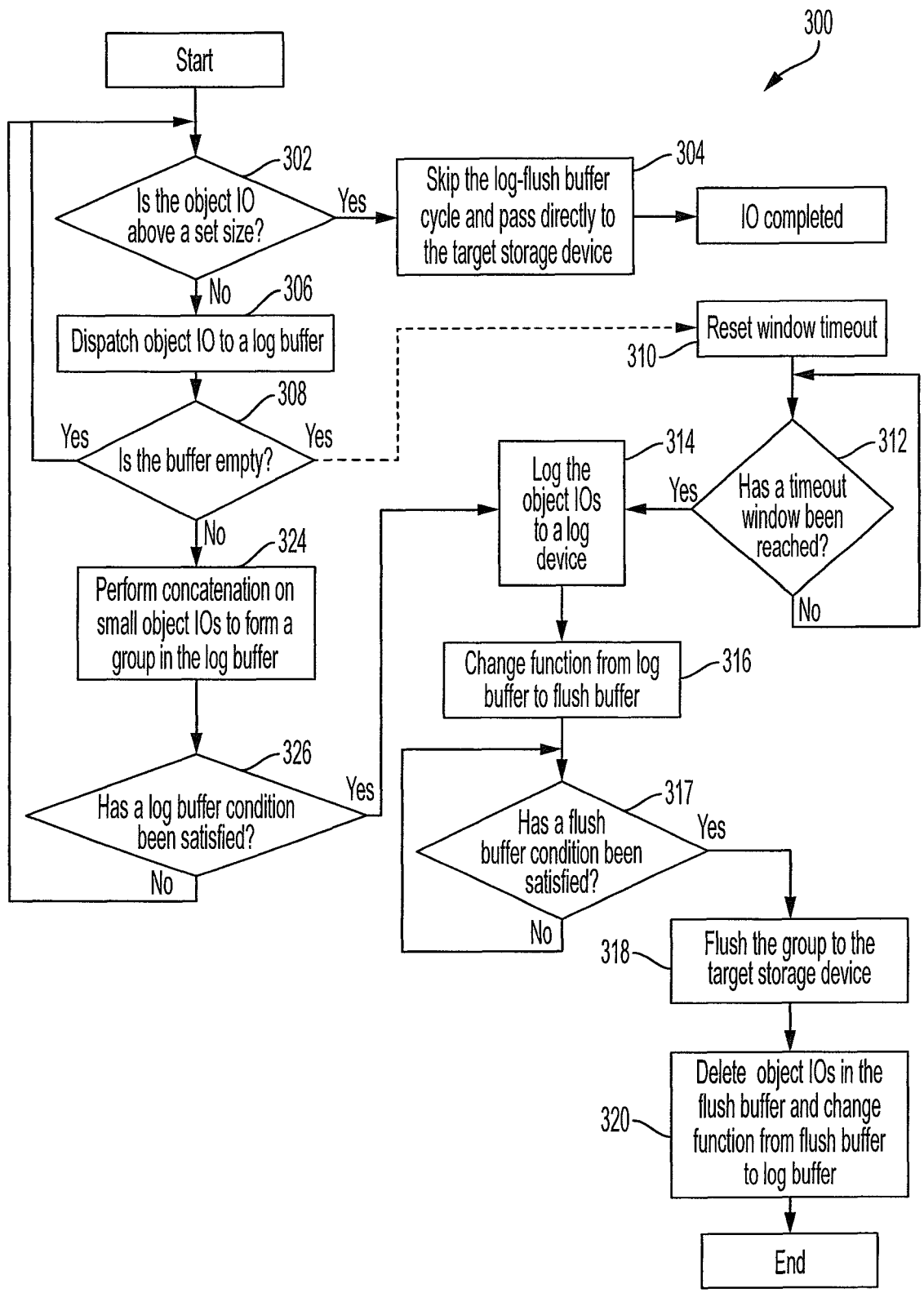
FIG. 3 is a flow chart illustrating an IO path based on a log-flush buffer cycle according to one or more embodiments of the present disclosure.

FIG. 3 is a flow chart 300 illustrating an IO path based on a log-flush buffer cycle according to one or more embodiments of the present disclosure.

Referring to FIG. 3, a target may receive an incoming object IO, and may determine whether the object IO is above, or at or above, a set size (302). The set size may be an adjustable threshold size that can be adjusted by an application programming interface or a config file. Accordingly, a threshold size may be used to determine whether an incoming object IO is a small object IO or a large object IO.

If the object IO is at or above the threshold size, then the object IO may skip the log-flush buffer cycle, and the object IO may pass directly to the target storage device (304) to be stored in persistent memory.

For example, by skipping the log-buffer cycle, a large object IO may proceed through a normal IO path without being saved in a low latency log device, and without passing through the log buffer or the flush buffer. Accordingly, because large object IOs do not suffer from latency issues otherwise associated with small object IOs, said latency issues being reduced by grouping small object IOs as described above, there may be little to no benefit gained by grouping large object IOs to save the large object IOs to the low latency log device.

However, if the object IO is below the set size, then the object IO (or small object IO) may be transmitted or dispatched to a first buffer of the target that functions as a log buffer (306).

At this point in time, if the log buffer is empty (308), then the object IO may be stored in the log buffer, and a timeout window may be reset (310). Thereafter, the timeout period may begin.

If the timeout window is reached before the log buffer stores the object IOs to a log device (312), then the object IOs currently in the log buffer may be logged to the log device (314).

Subsequently, the log buffer (e.g. the first buffer) may cease to function as a log buffer, and may thereafter act as a flush buffer (316). In one or more embodiments, the flush buffer holds one or more object groups as one or more log buffers swap or change function to act as a flush buffer. In other words, the flush buffer expands or increases in size to contain the contents of one or more log buffers.

The one or more object groups in the flush buffer may undergo further data processing, or may remain idle in the flush buffer, until a flush buffer condition is satisfied (317). For example, flush buffer conditions may correspond to idleness detection and/or memory cache size. Idleness detection may be based on an adjustable idleness timeout (e.g., an idleness timeout window), which may be based on the priority of the object IOs and/or the time since the last object group has been added to the flush buffer. In one or more embodiments, memory cache size may be based on an adjustable threshold of available space remaining in a memory cache (e.g., based on available space or memory remaining in a DRAM cache for the flush buffer and log buffer).

After a flush buffer condition is satisfied (317), the flush buffer may begin to flush or empty the key values stored therein to a target storage device, such as a KV-SSD (318).

In one or more embodiments, the target may include a second buffer that performs a function that is opposite a function performed by the first buffer. For example, while the first buffer functions as a log buffer, the second buffer functions as a flush buffer, and while the second buffer functions as a log buffer, the first buffer functions as a flush buffer. Accordingly, object IOs are able to continue to be dispatched to either the first buffer or the second buffer while the other buffer is flushing or transferring data to the target storage device.

After the contents of the flush buffer are stored on the target storage device (318), the key values of the flush buffer may be marked for deletion to be deleted from memory, and the flush buffer may again change roles to act as a log buffer (320), thereby completing a log-flush buffer cycle. In one or more embodiments, a software module running on top of the KV-SSD may trigger the changing or modifying of roles from log buffer to flush buffer, and from flush buffer to log buffer.

In one or more embodiments, the object IO may be dispatched to the log buffer within the timeout window, and the log buffer may already include one or more object IOs. That is, it may be determined that the buffer is not empty (308). In this case, concatenation may be performed on the object IOs to form an object group, or clip, in the log buffer (324). For example, each incoming small object IO may be individually concatenated to form a growing object group in the log buffer. Accordingly, the small object IOs may accumulate in the log buffer before being concatenated to form a group in the log buffer. Therefore, the object group may include multiple small key values/objects.

The log buffer may receive additional small IOs to include in an object group until one or more conditions are satisfied or triggered (326). For example, the condition may include one or more of an object group size surpassing an adjustable threshold size, an adjustable number of small object IOs being formed into an object group, and/or a timeout window lapsing. The one or more conditions may be adjusted by software inputs and/or an adaptive feedback algorithm. Therefore, the latency and throughput of small object IOs may be impacted depending on changes to the one or more conditions. A combination of the object group size, a number of small object IOs in the group, and/or elapsed time may be considered.

Even though completion of individual object IOs have longer latency due to acts such as concatenation, waiting periods, and logging the object group in a low latency log device, because the object group is effectively treated as a single large key value, average latency associated with the object group may be reduced compared to small object IOs being completed one at a time.

In other words, the log-flush buffer cycle may result in higher IO latency for the first small object IO stored in the log buffer. However, the log-flush buffer cycle may generally result in a lower average IO latency for an object group. For example, the grouping schema may reduce the latency of IOs in about half, and may about double the throughput for bursts of small object IOs.

Accordingly, as disclosed herein, embodiments of the present disclosure improve average latency and throughput for small object IOs by grouping small object IOs to treat the small object IOs as a single large object IO. Further, embodiments of the present disclosure adaptively accommodate a mixture of large object IOs and small object IOs to maintain both relatively high throughput on large object IOs and relatively low latency on small object IOs, thereby enhancing IO performance.

While the present disclosure has been particularly shown and described with reference to some example embodiments thereof, it will be understood by those of ordinary skill in the art that various changes in form and details may be made therein without departing from the spirit and scope of the present disclosure as set forth in the following claims and their equivalents.

What is claimed is:

1. A method of completing object IOs, the method comprising:
receiving, by a dispatcher of a target, a first set of object IOs for a target storage device associated with the target;
dispatching, by the dispatcher, the first set of object IOs to a first buffer of a first zone, the first buffer being configured to function as a first log buffer;
concatenating, by the target, the first set of object IOs to form a first object group in the first buffer;
logging, by the target, the first object group to a log device;
modifying, by the target, a function of the first buffer from the first log buffer to a first flush buffer;
transferring, by the target, the first object group to the target storage device; and
adjusting, by the target, a timeout window corresponding to a maximum amount of time for storing one of the first set of object IOs in the first log buffer, a maximum number of the first set of object IOs to be held in the first log buffer, or a threshold size of the first object group,
wherein the first object group is logged to the log device based on the timeout window, the maximum number of the first set of object IOs to be held in the first log buffer, or the threshold size of the first object group.

2. The method of claim 1, further comprising:
receiving, by the dispatcher, a second set of object IOs for the target storage device;
dispatching, by the dispatcher, the second set of object IOs to a second buffer of the first zone, the second buffer being configured to function as a second log buffer in response to the first buffer functioning as the first flush buffer;
concatenating, by the target, the second set of object IOs to form a second object group in the second buffer;
logging, by the target, the second object group to the log device;
modifying, by the target, a function of the second buffer from the second log buffer to a second flush buffer; and
transferring, by the target, the second object group to the target storage device.

3. The method of claim 2, further comprising:
receiving, by the dispatcher, a third set of object IOs for the target storage device;
dispatching, by the dispatcher, the third set of object IOs to a third buffer of a second zone, the third buffer being configured to function as a third log buffer;
concatenating, by the target, the third set of object IOs to form a third object group in the third buffer;
logging, by the target, the third object group to the log device;

modifying, by the target, a function of the third buffer from the third log buffer to a third flush buffer; and transferring, by the target, the third object group to the target storage device, wherein the third set of object IOs comprise high-priority data, and wherein the first set of object IOs or the second set of object IOs comprise low-priority data.

4. The method of claim 1, wherein the adjusting the timeout window, the maximum number of the first set of object IOs, or the threshold size is performed according to a feedback algorithm.

5. The method of claim 1, further comprising processing data stored in the first buffer using a field-programmable gate array.

6. The method of claim 1, further comprising:

receiving, by the dispatcher, large object IOs;

separating, by the dispatcher, the large object IOs from the first set of object IOs; and passing, by the dispatcher, the large object IOs directly to the target storage device.

7. The method of claim 1, wherein the transferring the first object group to the target storage device comprises:

searching, by the target, a linked list comprising dirty object IOs linked together; and transferring, by the target, the dirty object IOs to the target storage device, the dirty object IOs being of the first object group.

8. A non-transitory computer readable medium implemented on a system for completing object IOs, the non-transitory computer readable medium having computer code that, when executed on a processor, implements a method of completing object IOs by controlling a target, the method comprising:

receiving, by a dispatcher of the target, a first set of object IOs for a target storage device associated with the target;

dispatching, by the dispatcher, the first set of object IOs to a first buffer of a first zone, the first buffer being configured to function as a first log buffer;

concatenating, by the target, the first set of object IOs to form a first object group in the first buffer;

logging, by the target, the first object group to a log device;

modifying, by the target, a function of the first buffer from the first log buffer to a first flush buffer;

transferring, by the target, the first object group to the target storage device; and adjusting, by the target, a timeout window corresponding to a maximum amount of time for storing one of the first set of object IOs in the first log buffer, a maximum number of the first set of object IOs to be held in the first log buffer, or a threshold size of the first object group, wherein the first object group is logged to the log device based on the timeout window, the maximum number of the first set of object IOs to be held in the first log buffer, or the threshold size of the first object group.

9. The non-transitory computer readable medium of claim 8, wherein the computer code, when executed by the processor, further implements the method of completing object IOs by receiving, by the dispatcher, a second set of object IOs for the target storage device;

dispatching, by the dispatcher, the second set of object IOs to a second buffer of the first zone, the second buffer being configured to function as a second log buffer in response to the first buffer functioning as the first flush buffer;

concatenating, by the target, the second set of object IOs to form a second object group in the second buffer;

logging, by the target, the second object group to the log device;

modifying, by the target, a function of the second buffer from the second log buffer to a second flush buffer; and transferring, by the target, the second object group to the target storage device.

10. The non-transitory computer readable medium of claim 9, wherein the computer code, when executed by the processor, further implements the method of completing IOs by receiving, by the dispatcher, a third set of object IOs for the target storage device;

dispatching, by the dispatcher, the third set of object IOs to third buffer of a second zone, the third buffer being configured to function as a third log buffer;

concatenating, by the target, the third set of object IOs to form a third object group in the third buffer;

logging, by the target, the third object group to the log device; and modifying, by the target, a function of the third buffer from the third log buffer to a third flush buffer; and transferring, by the target, the third object group to the target storage device, wherein the third set of object IOs comprise high-priority data, and wherein the first set of object IOs or the second set of object IOs comprise low-priority data.

11. The non-transitory computer readable medium of claim 8, wherein the adjusting the timeout window, the maximum number of the first set of object IOs, or the threshold size is performed according to a feedback algorithm.

12. The non-transitory computer readable medium of claim 8, wherein the computer code, when executed by the processor, further implements the method of completing IOs by processing data stored in the first buffer using a field-programmable gate array.

13. The non-transitory computer readable medium of claim 8, wherein the computer code, when executed by the processor, further implements the method of completing IOs by receiving large object IOs;

separating the large object IOs from the first set of object IOs; and passing the large object IOs directly to the target storage device.

14. The non-transitory computer readable medium of claim 8, wherein the transferring the first object group to the target storage device comprises:

searching a linked list comprising dirty object IOs linked together; and transferring the dirty object IOs to the target storage device, the dirty object IOs being of the first object group.

15. A system for completing object IOs, the system comprising a target storage device and a target associated with the target storage device, the target comprising a dispatcher, a memory cache, and a log device, wherein the system is configured to:

receive, by the dispatcher, a first set of object IOs for the target storage device;

dispatch, by the dispatcher, the first set of object IOs to a first buffer of a first zone of the memory cache, the first buffer being configured to function as a first log buffer;
concatenate, by the target, the first set of object IOs to form a first object group in the first buffer;
log, by the target, the first object group to the log device;
modify, by the target, a function of the first buffer from the first log buffer to a first flush buffer;
transfer, by the target, the first object group to the target storage device; and
adjust, by the target, a timeout window corresponding to a maximum amount of time for storing one of the first set of object IOs in the first log buffer, a maximum number of the first set of object IOs to be held in the first log buffer, or a threshold size of the first object group,
wherein the first object group is logged to the log device based on the timeout window, the maximum number of the first set of object IOs to be held in the first log buffer, or the threshold size of the first object group.

16. The system for completing object IOs of claim 15, wherein the system is further configured to:
receive, by the dispatcher, a second set of object IOs for the target storage device;
dispatch, by the dispatcher, the second set of object IOs to a second buffer of the first zone of the memory cache, the second buffer being configured to function as a second log buffer in response to the first buffer functioning as the first flush buffer;
concatenate, by the target, the second set of object IOs to form a second object group in the second buffer;
log, by the target, the second object group to the log device;
modify, by the target, a function of the second buffer from the second log buffer to a second flush buffer; and
transfer, by the target, the second object group to the target storage device.

17. The system for completing object IOs of claim 16, wherein the system is further configured to:
receive, by the dispatcher, a third set of object IOs for the target storage device;
dispatch, by the dispatcher, the third set of object IOs to third buffer of a second zone of the memory cache, the third buffer being configured to function as a third log buffer;
concatenate, by the target, the third set of object IOs to form a third object group in the third buffer;
log, by the target, the third object group to the log device;
modify, by the target, a function of the third buffer from the third log buffer to a third flush buffer; and
transfer, by the target, the third object group to the target storage device,
wherein the third set of object IOs comprise high-priority data, and
wherein the first set of object IOs or the second set of object IOs comprise low-priority data.

* * * * *